United States Patent [19]

Crane

[11] Patent Number: 5,778,933
[45] Date of Patent: *Jul. 14, 1998

[54] ORIFICE FITTING

[75] Inventor: Dreu E. Crane, Broken Arrow, Okla.

[73] Assignee: Crane Manufacturing, Inc., Tulsa, Okla.

[ * ] Notice: The term of this patent shall not extend beyond the expiration date of Pat. No. 5,588,467.

[21] Appl. No.: 694,860

[22] Filed: Aug. 9, 1996

Related U.S. Application Data

[63] Continuation-in-part of Ser. No. 613,907, Mar. 11, 1996, Pat. No. 5,758,692, which is a continuation-in-part of Ser. No. 404,516, Mar. 15, 1995, Pat. No. 5,588,467.

[51] Int. Cl.$^6$ ........................................ F15D 1/02
[52] U.S. Cl. ........................ 138/44; 138/45; 138/94
[58] Field of Search ........................ 138/44, 45, 94, 138/94.3

[56] References Cited

U.S. PATENT DOCUMENTS

| | | |
|---|---|---|
| 1,273,597 | 7/1918 | Fisher . |
| 1,808,715 | 6/1931 | Reynolds . |
| 1,924,125 | 8/1933 | Linderman, Jr. . |
| 1,980,699 | 11/1934 | Robinson . |
| 1,996,192 | 4/1935 | Daniel . |
| 2,014,682 | 9/1935 | Greene . |
| 2,050,544 | 8/1936 | Robinson et al. . |
| 2,585,290 | 2/1952 | Walker . |
| 3,817,287 | 6/1974 | Aitken . |
| 4,014,366 | 3/1977 | Critendon . |
| 4,370,893 | 2/1983 | Combes . |
| 4,380,936 | 4/1983 | Van Scoy . |
| 4,393,722 | 7/1983 | Scott . |
| 4,399,708 | 8/1983 | Van Scoy . |
| 4,410,010 | 10/1983 | Van Scoy . |
| 4,413,532 | 11/1983 | Van Scoy . |
| 4,422,339 | 12/1983 | Gall et al. . |
| 4,425,806 | 1/1984 | Van Scoy . |
| 4,476,730 | 10/1984 | Brumm ................................ 138/94 |
| 4,478,251 | 10/1984 | Sanchez et al. . |
| 4,593,915 | 6/1986 | Seger et al. . |
| 5,042,531 | 8/1991 | Foster et al. . |
| 5,050,842 | 9/1991 | Foster et al. . |
| 5,094,272 | 3/1992 | Foster et al. . |
| 5,181,542 | 1/1993 | Wass et al. . |
| 5,305,796 | 4/1994 | Klak . |
| 5,327,938 | 7/1994 | Crane . |
| 5,327,941 | 7/1994 | Bitsakis et al. . |
| 5,464,036 | 11/1995 | Tomkins ............................ 138/94.3 |
| 5,474,103 | 12/1995 | Klak ................................... 138/44 |

OTHER PUBLICATIONS

Berger, B. and Anderson, K., "Gas Handling and Field Processing," PennWell Books, Jan. 1980, pp. 119–127.

*Primary Examiner*—Denise L. Ferensic
*Assistant Examiner*—James F. Hook
*Attorney, Agent, or Firm*—Head, Johnson & Kachigian

[57] ABSTRACT

A process to access a plate carrier having an orifice plate and carrier plate seal and an orifice fitting. The process includes moving the plate carrier from a pressurized orifice body lower chamber to an orifice body upper chamber. A seal ring is sealed in the upper chamber against the plate carrier to create a fluid type seal between the upper body chamber and the plate carrier. Pressure is bled off in the upper chamber to the atmospheric pressure. An entry plug threadably connected to a retainer is unscrewed and a crank removed to allow access to the orifice plate and to the carrier plate seal. The crank and entry plug are replaced and the upper chamber is repressurized. The seal ring may then be loosened from the plate carrier before returning the plate carrier to the lower body chamber.

12 Claims, 8 Drawing Sheets

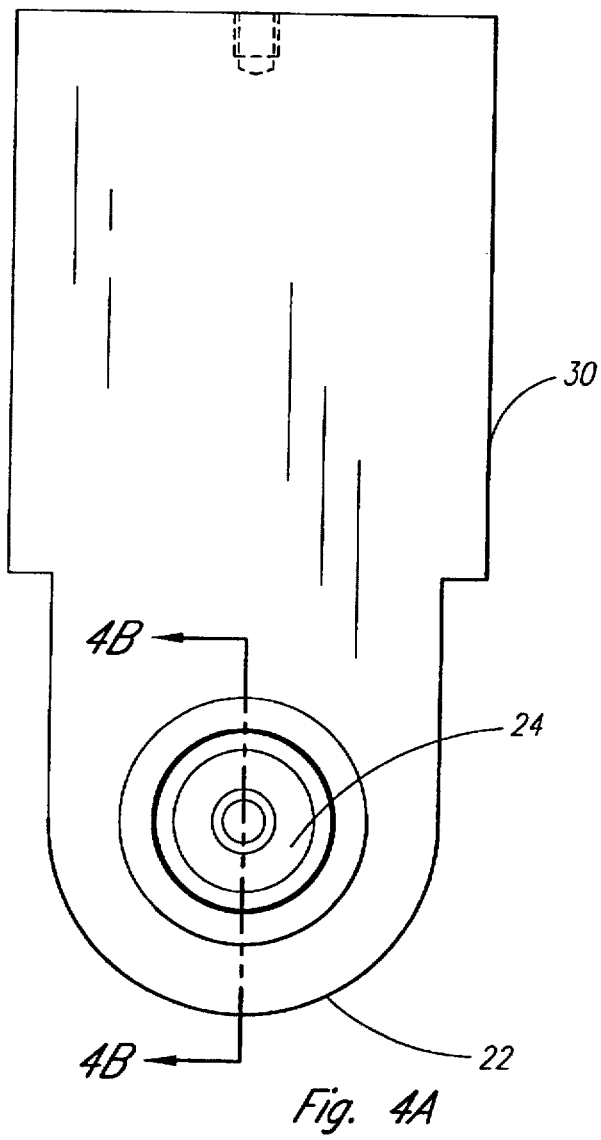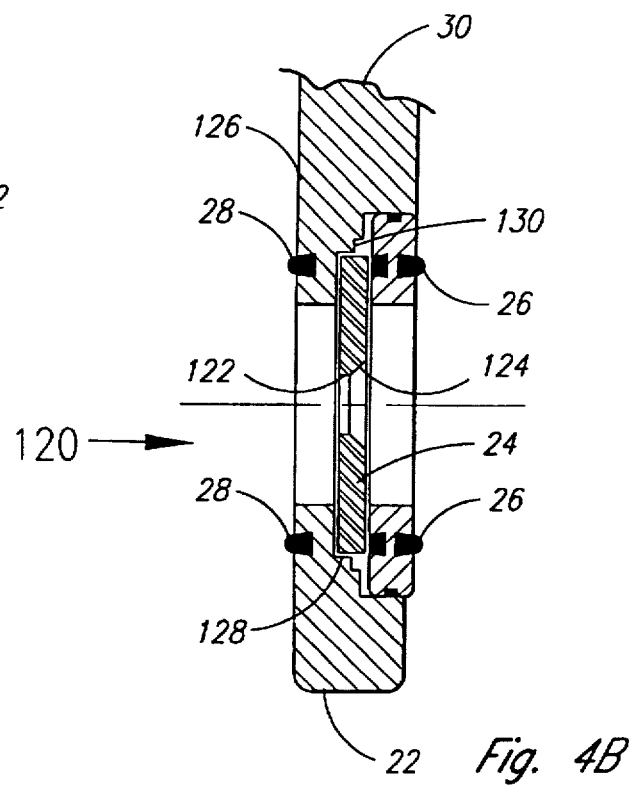

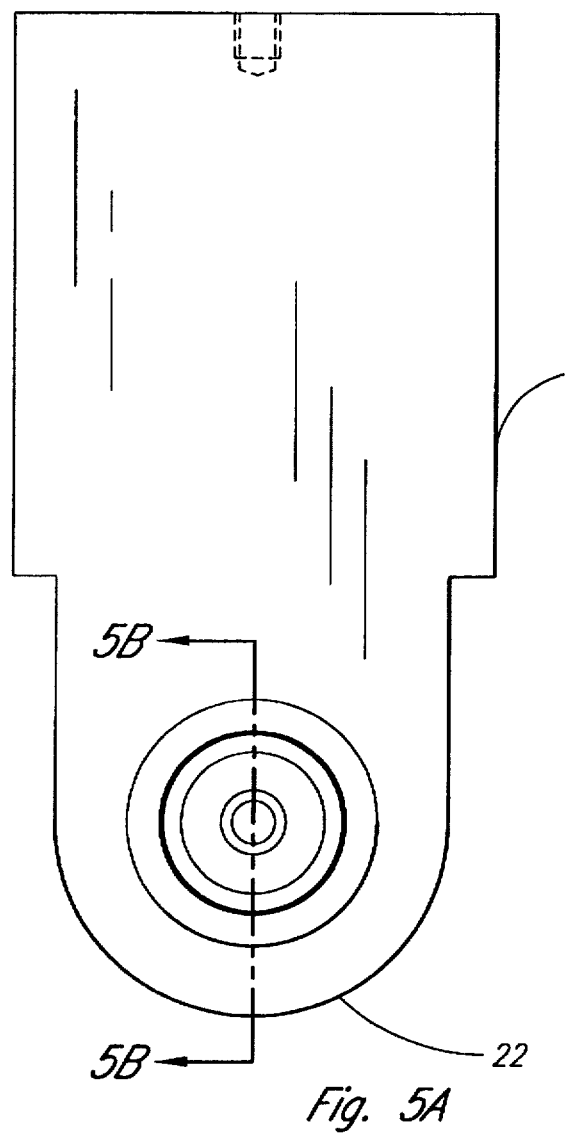
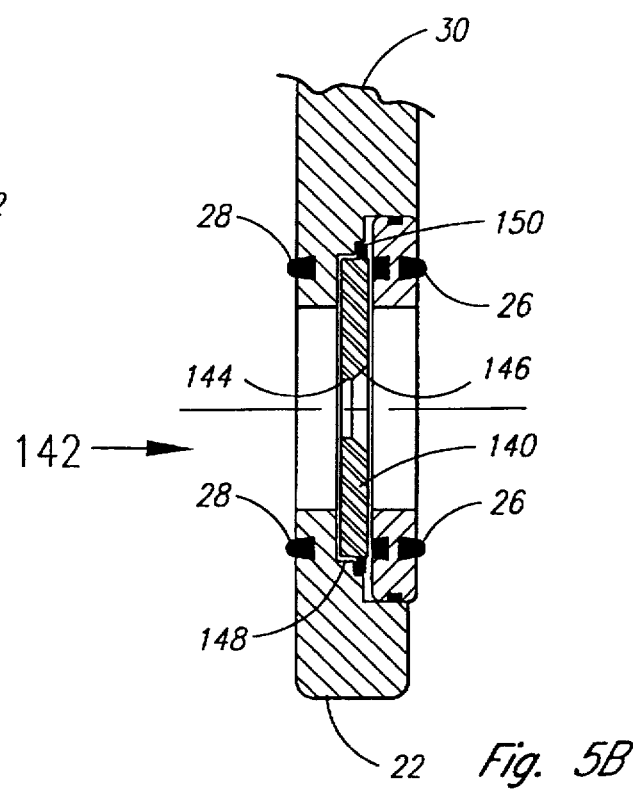
Fig. 5A
Fig. 5B

ORIFICE FITTING

CROSS REFERENCE OF APPLICATION

The application is a continuation-in-part application of U.S. patent application Ser. No. 08/613,907, filed Mar. 11, 1996, entitled ORIFICE FITTING, now U.S. Pat. No. 5,758,692 which is a continuation-in-part application of U.S. patent application Ser. No. 08/404,516, filed Mar. 15, 1995, entitled ORIFICE FITTING now U.S. Pat. No. 5,588,467.

BACKGROUND OF THE INVENTION

1. Field of the Invention

The present invention is directed to an orifice fitting for measurement of fluid flow in a system wherein a plate carrier may be raised out of the fluid flow path in the system for service and maintenance without interrupting or disabling fluid flow.

2. Prior Art

While fluid may be measured with various types of meters such as positive displacement meters, turbine meters, and venturi meters, orifice meters are widely used in the field and in pipeline systems.

Fluid flowing through a pipe can be measured by placing a constriction, such as an orifice plate, in the line to cause a pressure drop as it flows through the orifice plate. There is a direct relationship between the amount of this pressure drop, called the differential pressure, and the rate of flow.

Extensive use is made of orifice fittings of various types. The inlet side of the fitting is connected to the upstream section of pipe, while the outlet side is connected to the downstream section.

Two types of orifice fittings are commonly employed. The junior™ or "simplex" fitting has a single orifice chamber wherein the orifice plate is mounted in place in the flow path of the pipeline. In order to remove the orifice plate for maintenance or servicing, the fluid pressure in the pipeline must be removed so that the fitting can be disassembled. In the second type of orifice fitting, a senior™ or "duplex" fitting, two separate chambers are provided, one lower chamber to hold the orifice plate in position for passage of fluid through the pipeline and a second upper chamber wherein access is provided for service and maintenance. A valve is typically provided to separate the compartments from each other. As an example, see Critendon U.S. Pat. No. 4,014,366, for a device to convert a junior fitting to a senior fitting.

There is a need, therefore, to provide an orifice fitting wherein access may be had to both the orifice plate and the various carrier plate seals without interrupting fluid flow through the lower chamber and without disabling the fitting.

It is also desirable to provide an orifice fitting which provides access to both sides of the carrier plate.

The horizontal and vertical alignment of the orifice opening in the orifice plate with the tube or pipeline is critical both for accuracy of flow measurement and because of regulations, such as American Petroleum Institute regulations. An example of a mechanism to concentrically align the orifice is shown in Crane, U.S. Pat. No. 5,327,938 and Klak, U.S. Pat. No. 5,305,796.

It is, therefore, also desirable to provide an orifice fitting to provide concentric alignment of the orifice and orifice plate when in the lower chamber.

It is also desirable to provide an orifice fitting that may be raised out of the fluid flow path or lowered into the fluid flow path through a motorized mechanism.

Fluid in the system is often under considerable pressure and care must be taken to observe precautions.

It is also desirable to provide an orifice plate fitting wherein inspection and maintenance may be performed on the orifice plate after determining and confirming that the upper chamber is not pressurized.

It is also desirable to provide an orifice fitting with the ability to verify that no fluids bypass around the O-rings of the carrier.

The teachings of the present invention may also be employed in a gate valve. A plate may be lowered into or out of the fluid flow path.

It is desirable to provide a gate valve having a full bore that will allow flow therethrough without any restriction in flow.

It is also desirable to provide a gate valve wherein access is provided to the plate without disabling the valve.

The orifice plate opening has evolved over the years so that, today, orifice plates often utilize openings with chamfered or beveled edges or quadrant, radiused edges on their inlet side. While these plates provide enhanced accuracy in measurement of fluid flow, they must be installed in the proper orientation.

Measurement orifice plates are replaced frequently by field personnel. If the orifice plate is installed backwards, it would not be detectable from the exterior. Installing the orifice plate backwards will effect the fluid flow and negatively influence the accuracy of the fluid measurement. An error of 15% to 17% would not be uncommon.

Accordingly, it is a principal object and purpose of the present invention to provide an orifice fitting that will accept either a standard, existing orifice plate or a unidirectional plate suggested by the present invention.

It is a further object and purpose of the present invention to provide a carrier plate that can only be installed in a preferred fluid flow direction.

It is a further object and purpose of the present invention to provide a unidirectional orifice plate for either a single or a dual chamber orifice fitting.

It is a further object and purpose of the present invention to provide a duplex orifice fitting having the ability to depressurize the upper chamber prior to accessing the upper chamber for inspection and maintenance.

It is an additional object and purpose to provide a duplex orifice fitting having the ability to pressurize the upper chamber up to the pressure level of the lower chamber.

BRIEF DESCRIPTION OF THE DRAWINGS

FIGS. 4a and 4b are an enlarged carrier plate and a standard orifice plate for the fitting shown in FIG. 1;

FIGS. 5a and 5b are an enlarged carrier plate and a unidirectional orifice plate for the fitting shown in FIG. 1;

DETAILED DESCRIPTION OF THE PREFERRED EMBODIMENTS

Figure 1:
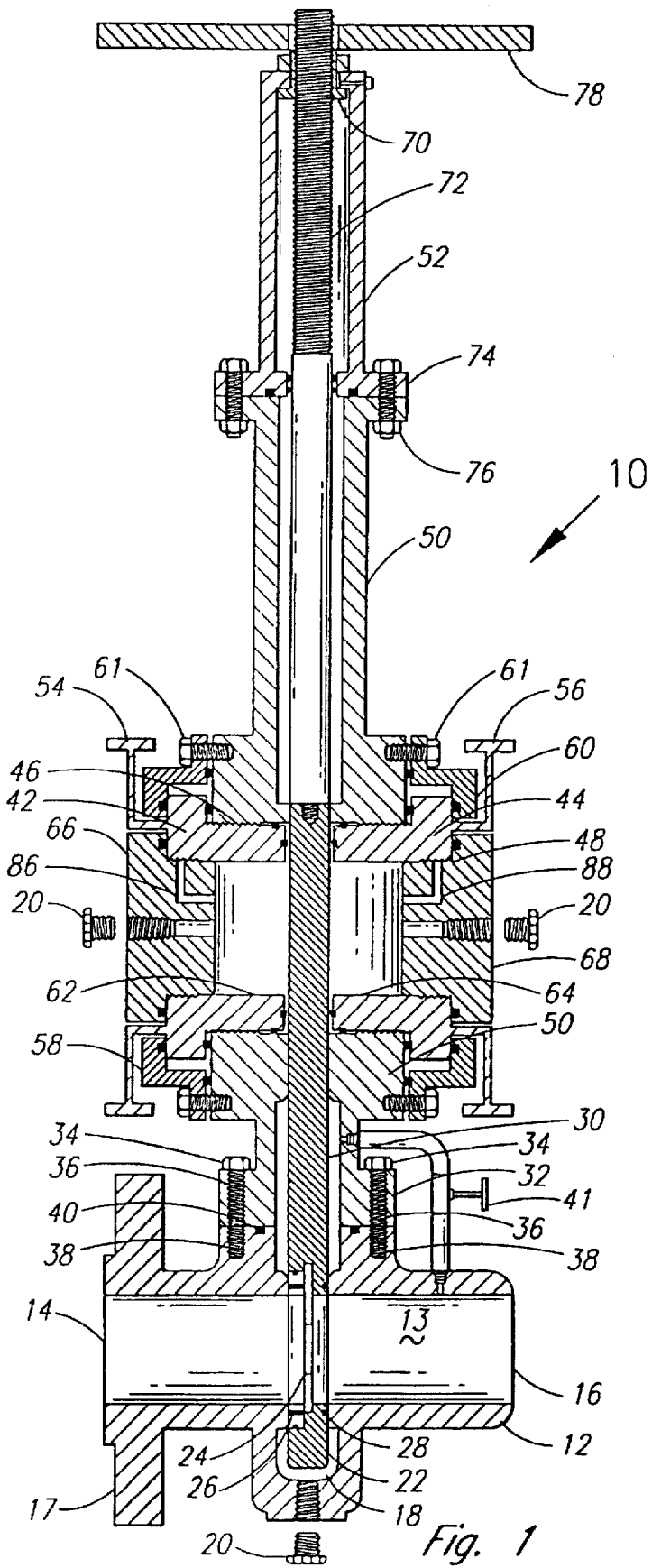
FIG. 1 is a sectional view of an orifice fitting for measurement of fluid flow constructed in accordance with the present invention.

Referring to the drawings in detail. FIG. 1 illustrates a sectional view of an orifice fitting 10 for measurement of fluid flow therethrough constructed in accordance with the present invention. The orifice fitting includes an orifice body lower chamber 12. The lower chamber has a tubular opening 13 and a pair of open ends 14 and 16 which would be connected to a pipeline or other system (not shown) for fluid flow therethrough. The ends 14 and 16 will be connected by known connection means, such as flange 17. Additionally, the ends 14 and 16 would be in communication with pressure measurement instrumentation (not shown) so that the pressure drop is determined.

The lower chamber 12 includes a receptacle 18 which is transverse to the fluid flow through the pipeline. One end of the opening 18 may be sealed by a threaded bottom plug 20 (shown exploded for clarity).

The lower chamber 12 may be integral with the orifice fitting or may be an existing, simplex or single chamber fitting that is converted into a duplex or double chamber fitting by the teachings of the present invention.

Received within the receptacle 18 is an orifice plate carrier 22 which extends across and is parallel with the diameter of the tubular opening 13 through the lower chamber 12. FIG. 1 is a depiction of the plate carrier 22 in the operational or flow-through position. In the flow-through position shown in FIG. 1, the fluid flow will be blocked from passing through the fitting 10 with the exception of an orifice in an orifice plate 24 held by the carrier 22.

Also included on the plate carrier 22 are carrier plate seals 26 and 28 which extend from the opposed faces of the plate carrier. The carrier plate seals 26 and 28 mate with the lower chamber 12 at the receptacle 18 to form a fluid-tight seal between the plate carrier 22 and the lower chamber 12. Accordingly, when in use, no fluid flow is permitted except through the ends 14 and 16 of the fitting 10.

The orifice plate carrier 22 has a carrier extension 30 which extends radially from the tubular opening 13. The carrier extension 30 is received in and travels in an orifice body upper chamber 32.

The upper body chamber 32 may be permanently affixed to the lower chamber or, as shown in FIG. 1, may be secured by fasteners such as bolts 34 which pass through openings 36 in the upper chamber and are received in threaded openings 38 in the lower chamber. A gasket or gaskets 40 assists in assuring a fluid-tight seal between the upper and lower chambers. It will be observed that a simplex fitting that has a lower chamber 12 may thus be converted to a duplex fitting.

An optional pressure equalization valve 41 may be provided between the upper and lower chamber.

The upper chamber 32 includes a pair of opposed seal rings 42 and 44. Each of the seal rings 42 and 44 has external threads 46 and 48, respectively, which engage a bonnet 50. The seal rings 42 and 44 each have extending handles 54 and 56 in order to rotate the rings. Each seal ring thus may be independently tightened or loosened.

Each seal ring 42 and 44 has a seal ring retainer 58 and 60, respectively, which is fastened to the bonnet 50 by cap screws 61.

Each seal ring 42 and 44 has an internally threaded cavity 62 and 64, respectively, in which is received an access or entry plug 66 and 68 having external threads.

The carrier extension 30 terminates in a stem nut 70 which threadably engages a stem screw 72. The stem screw 72 is sealed within both the bonnet and a stem yoke body 52 by holder 74 and fasteners 76.

The stem screw 72 passes through the holder 74 and terminates in a screw handle 78 so that rotation of the handle rotates the screw.

Figure 2:
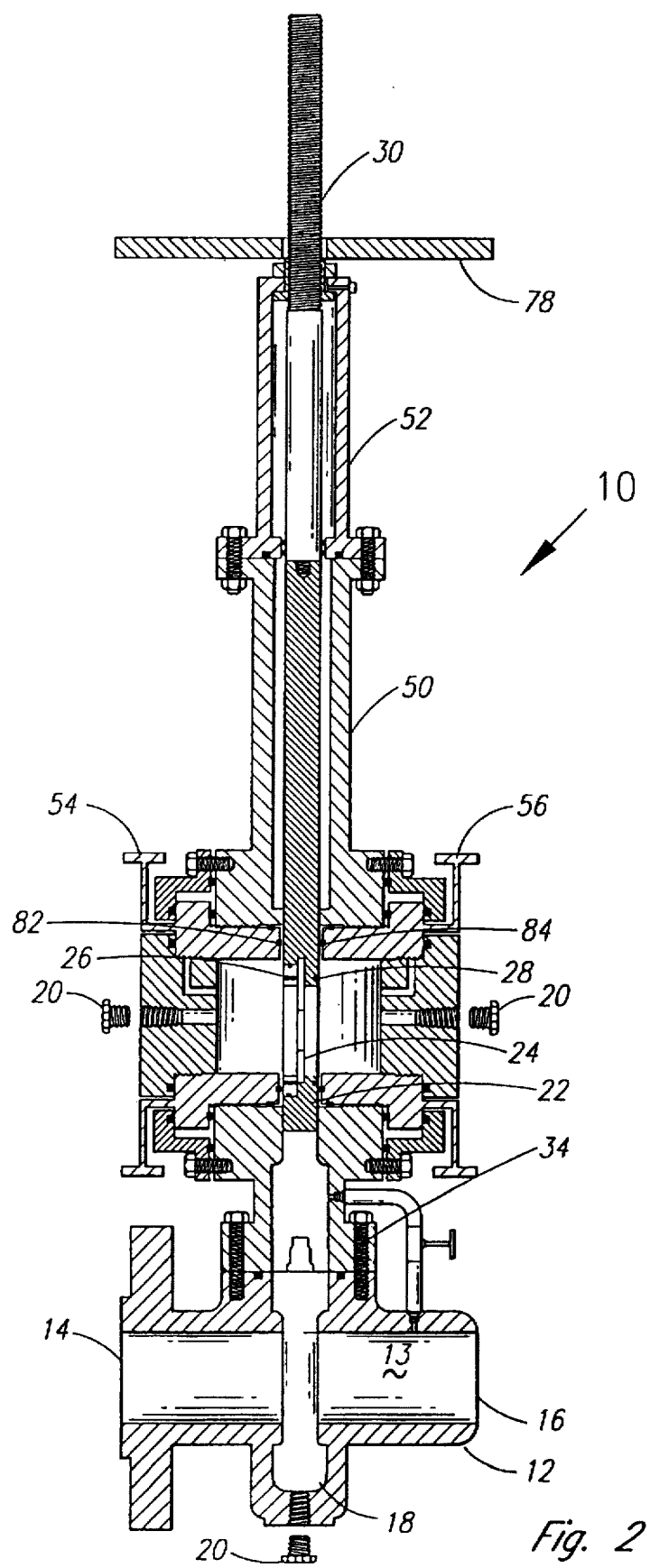
FIG. 2 is a sectional view of the orifice fitting shown in FIG. 1 with its plate carrier moved into an upper chamber.

The orifice plate carrier 22 and its associated plate and seals are movable between the lower chamber 12, as shown in FIG. 1, and the upper chamber, as shown in the sectional view in FIG. 2.

As the stem screw 72 is rotated by rotation of the handle 78, the stem nut will ascend toward the handle and away from the lower chamber 12. Accordingly, the carrier extension 30 will also move and the plate carrier 22 will be raised out of the receptacle 18 and upward into the upper body chamber 32. Once the plate carrier is removed from the lower chamber, fluid flow will pass freely through the tubular opening 13. Continued rotation of the handle 78 will cause the carrier to be raised into the cavities 62 and 64 formed by the seal rings.

Once the carrier is fully raised adjacent the cavities of the seal rings 42 and 44, each seal ring can be independently tightened against the plate carrier 22. As best seen in FIG. 2, seal ring gaskets 82 and 84 extend from the seal rings and assist in maintaining the seal between the faces of the plate carrier and the seal rings. After the seal rings have been tightened against the carrier, no fluid flow from the lower chamber or from the fluid system itself will be permitted into the cavities 62 and 64.

Thereafter, at least one entry plug may be unscrewed partially from its seal ring. Each entry plug includes a bleed hole 86 and 88. Each bleed hole communicates with the cavity of the upper chamber. Accordingly, any pressurized fluid in the cavity of the upper chamber 32 will quickly dissipate. If continued fluid flow is observed through the bleed hole, the operator (not shown) will be alerted that a problem exists so that the entry plug may be retightened and sealed and other action, such as terminating the fluid flow through the fitting, may be taken. At least one entry plug may also be provided with an opening to receive an optional pressure measurement device to monitor the pressure in the cavities locally or remotely.

The entry plugs also provide a mechanism to detect leakage between the carrier plate and the lower chamber when in the operational position shown in FIG. 1. To utilize this leakage detection mechanism, the equalization valve must be closed. At least one entry plug may be unscrewed partially from its seal ring. If continued fluid flow exists, a problem with the carrier plate seals 26 or 28 is present.

Returning to a consideration of FIG. 2, it will be observed that when the carrier 22 is in the cavities 62 and 64 of the seal rings, the entire orifice plate 24 along with each of the carrier plate seals 26 and 28 are fully accessible. The cavities have a larger diameter than the plate and the carrier seals. By removing the entry plugs 66 and 68, full access is provided to both sides of the plate carrier and both sides of the orifice plate 24. While maintenance and service is provided on the carrier and its accompanying plate and seals, fluid flow may continue through the lower chamber so that fluid flow through the system is not interrupted. The present fitting 10 is also easily adaptable to mechanized procedures wherein the stem handle is replaced by an external motor or other device to rotate the stem screw.

To return the orifice plate 24 to the operational position, the reverse procedure is performed. The entry plugs 66 and 68 are replaced by threading into the seal rings. Thereafter, each of the seal rings is rotated to loosen the fluid-tight connection between the seal rings and the carrier. Once the seal rings have been disengaged from the carrier, the screw handle 78 may be rotated in order to move the carrier downward back into the operational or flow-through position shown in FIG. 1.

The seal rings 42 and 44 will tighten in the opposite or counterclockwise direction than normal. Thus, when an entry plug is unscrewed by turning counterclockwise, it will tend to tighten the seal ring.

Figure 3:
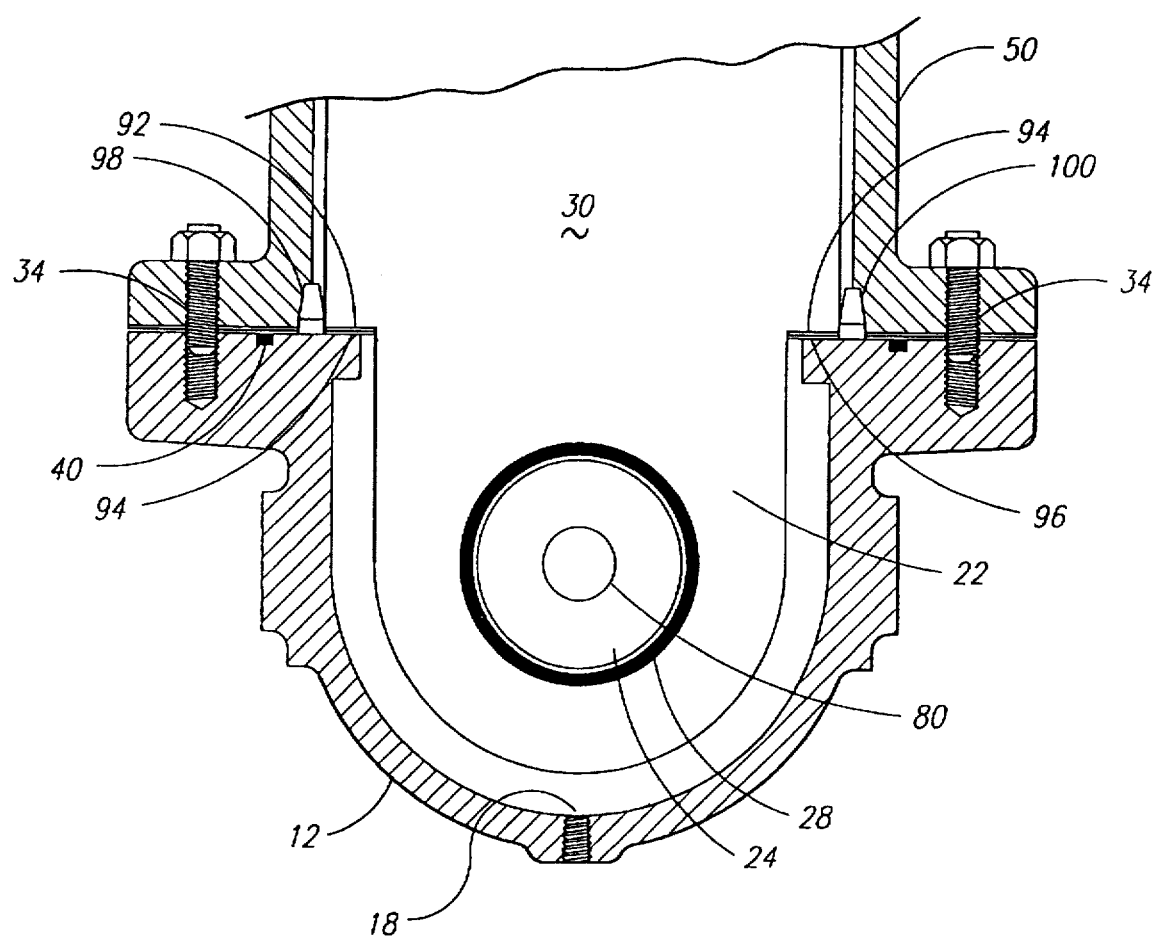
FIG. 3 is a partial sectional view of the lower chamber of the orifice fitting as shown in FIG. 1.

FIG. 3 is a partial sectional view of the lower chamber 12 of the orifice fitting 10 with the carrier 22 in the operational position as shown in FIG. 1. The orifice opening 88 in the carrier plate 24 is visible. The carrier plate seal 26 which extends from the face of the plate carrier 22 surrounds the plate 24.

It is important to properly concentrically align the orifice opening 80 in the lower chamber. Provisions for both horizontal and vertical alignment are provided in the present invention. The plate carrier 22, or the carrier extension 30, is provided with edges 90 and 92 that will rest on ledges 94 and 96. Accordingly, the plate 24 is vertically aligned in the lower chamber.

A pair of tapered alignment pins 98 and 100 extend from the lower chamber 12 or the bonnet 50 of the upper body. As the carrier 22 and extension 30 descend toward the lower chamber, the alignment pins will engage the carrier or the extension in order to horizontally align the plate and its orifice in the lower chamber.

It will be appreciated that the operation of the stem screw 72 may be motorized by a motor to replace manual rotation of the handle 78.

FIGS. 4A and 4B show an enlarged standard orifice plate 24 and an enlarged carrier 22 for receipt of the orifice plate 24. The orifice plate 24 illustrated in FIGS. 4A and 4B is of the standard design, being a flat circular disk having a pair of opposed faces with an opening for fluid flow. The orifice plate 24 has a preferred fluid flow direction illustrated by arrow 120.

The orifice plate includes a central opening 122 having a chamfered or beveled edge 124 on the outlet side which influences the fluid dynamics and the fluid measurement.

The plate carrier 22 includes a double circular shoulder 126 having a first shoulder 128 and a concentric second shoulder 130 having a larger diameter than the first shoulder 128. In the embodiment shown in FIGS. 4A and 4B, the outside diameter of the standard orifice plate 24 is slightly less than the diameter of the first shoulder 128 so that the orifice plate 24 fits therein. A standard orifice plate will, thus, be received in the plate carrier.

FIGS. 5A and 5B show the enlarged plate carrier 22 shown in FIGS. 4A and 4B with an alternate, enlarged orifice plate 140. The preferred fluid flow direction is shown by arrow 142.

The orifice plate 140 includes a central opening 144 having a chamfered or beveled edge 146 on the outlet side which influences the fluid dynamics and the fluid measurement. The orifice plate 140 is a cylindrical disk having a pair of opposed faces. A first edge portion 148 with a first diameter mates with the first shoulder 128 of the plate carrier. A second concentric edge portion 150 with a larger diameter than the first portion mates with the second shoulder 130 of the carrier. The second edge portion 150 of the orifice plate will not fit within the first shoulder of the plate carrier. Accordingly, the plate can only be installed in one preferred direction.

It will be appreciated that the orifice plate 140 in FIGS. 5A and 5B might be utilized in either a single, junior or a dual, senior chamber fitting.

Figure 6A:
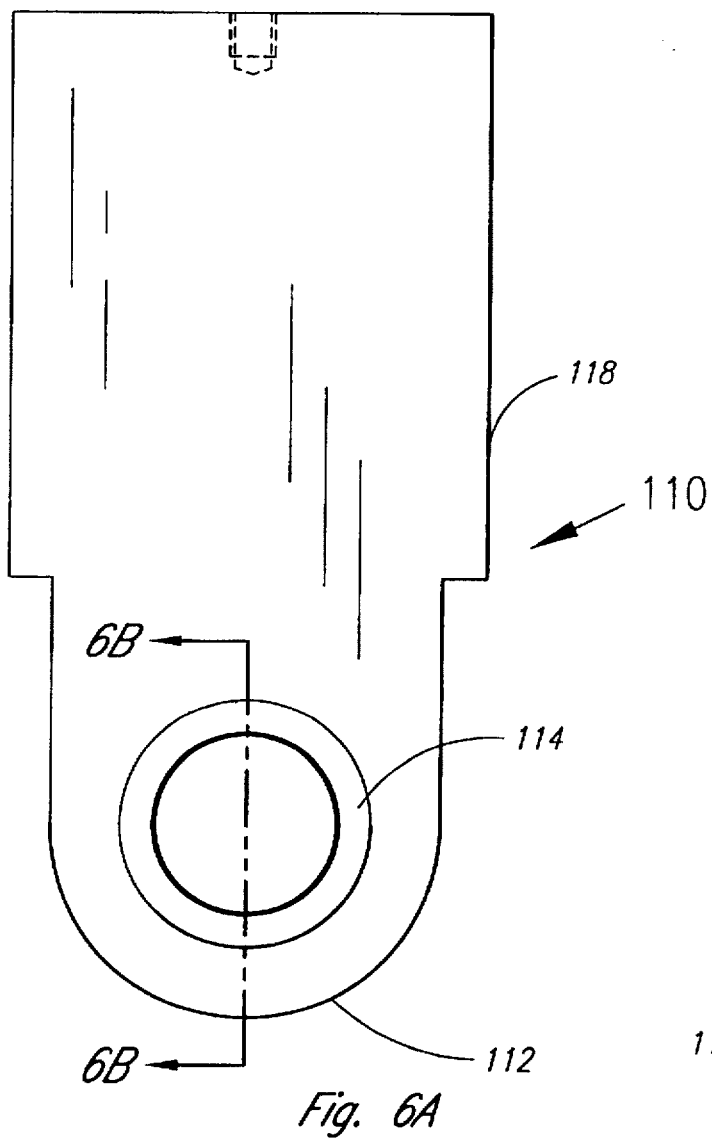
FIGS. 6a and 6b illustrate an alternate embodiment of the present invention.
Figure 6B:
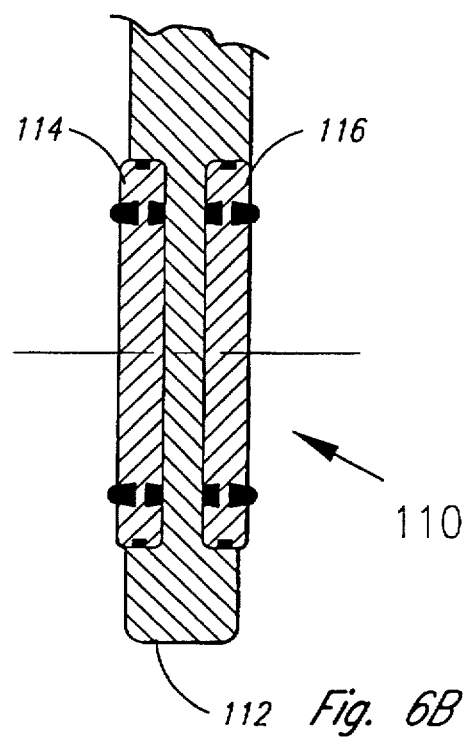

FIGS. 6A and 6B illustrate a further alternate embodiment 110 wherein the teachings of the present invention are employed in a gate valve for controlling fluid flow through a pipeline or other fluid system. Rather than an orifice plate, a solid, flat plate 112 is employed with plate seals 114 and is on each opposed face. A valve body lower chamber (not seen in FIGS. 6A or 6B) is provided for receipt of the plate therein. When the plate is in the lower chamber, the seals may join with the lower chamber to form a fluid-tight seal.

A separate valve body upper chamber also is capable of receiving the plate. The plate has a carrier extension 118 which extends radially from the lower chamber. The upper chamber includes a pair of opposed seal rings, each of which is independently tightenable against the plate.

The plate seals 114 and 116 may be fabricated from replaceable teflon rings or discs which project out from the surface of the plate. Accordingly, when the plate is in the lower chamber, there is no metal-to-metal contact in the closed position.

It will be appreciated that the orifice fitting embodiment shown in FIGS. 1 through 5 may be converted to a gate valve embodiment as shown in FIGS. 6A and 6B by replacing the orifice plate with a closed plate.

Figure 7:
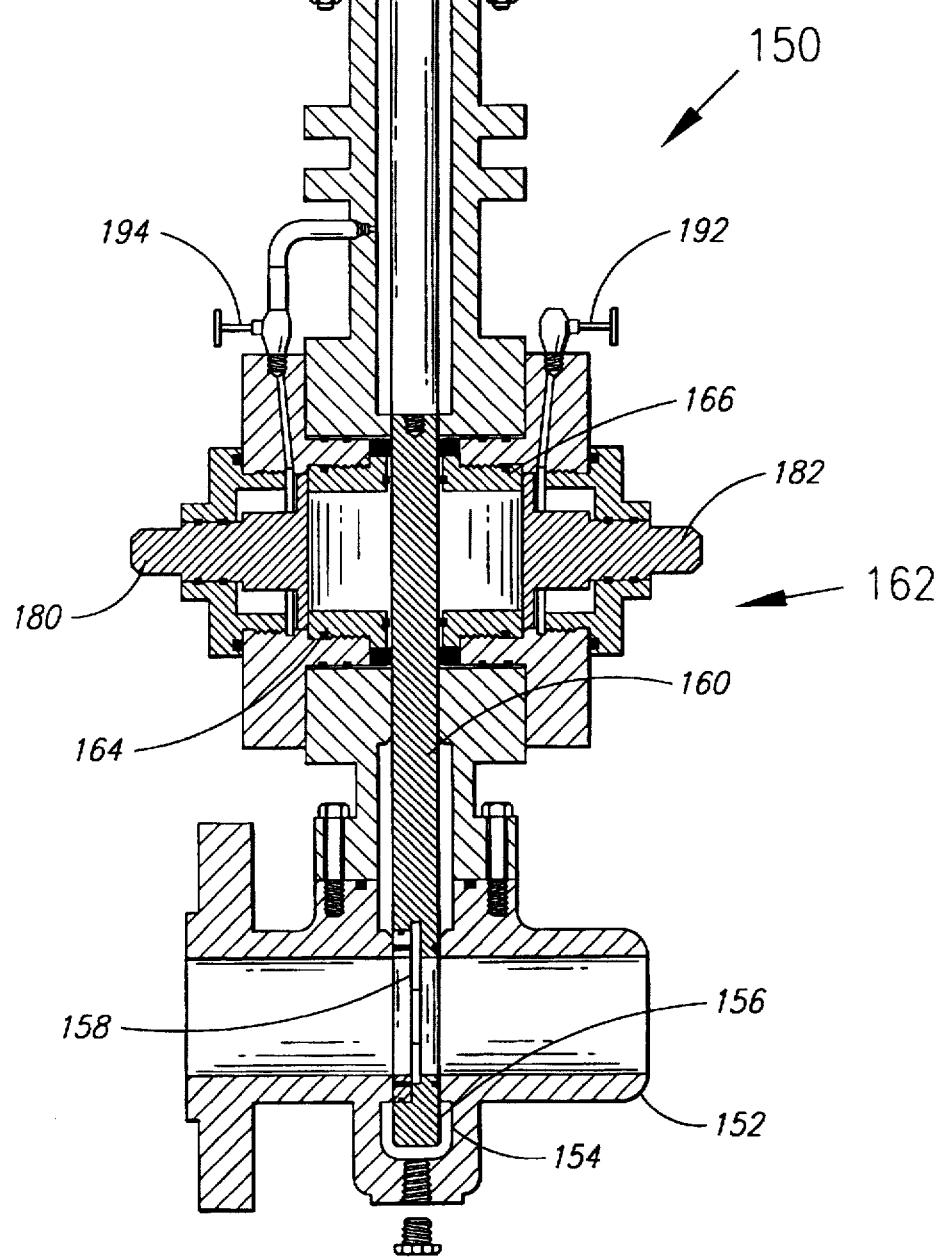
FIGS. 7 and 8 illustrates a further alternate embodiment of the orifice fitting for measurement of fluid flow.
Figure 8:
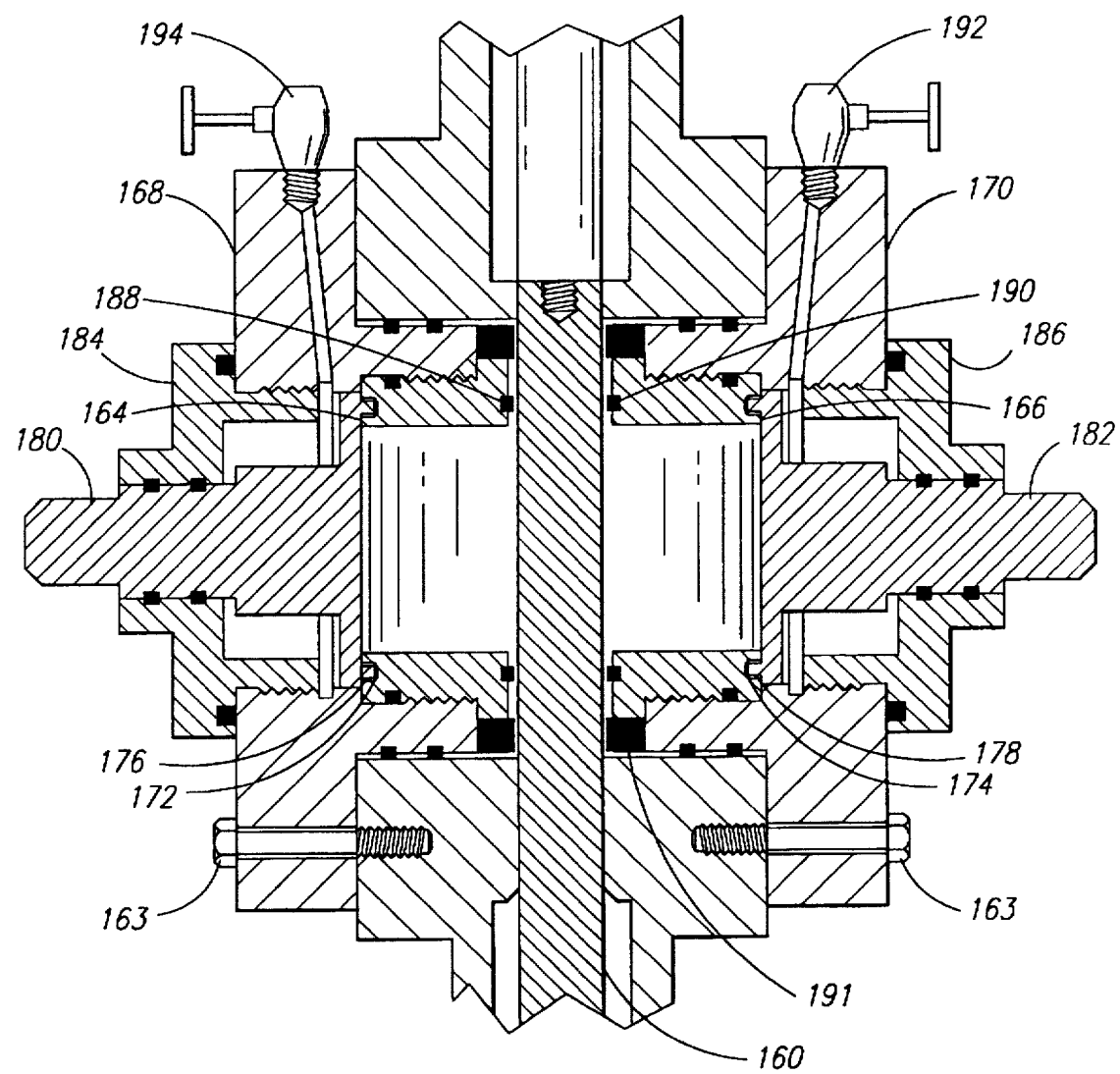

FIGS. 7 and 8 illustrate a further alternate embodiment of an orifice fitting for measurement of fluid flow.

FIG. 7 illustrates a sectional view of an orifice fitting 150 for measurement of fluid flow thereto constructed in accordance with the present invention. The orifice fitting 150 includes an orifice body lower chamber 152.

The lower chamber 152 includes a receptacle 154 which is transverse to the fluid flow through the pipeline. Received within the receptacle 154 is an orifice plate carrier 156. FIG. 7 is a depiction of the plate carrier 156 in the operation or flow-through position. In the flow-through position shown in FIG. 7, the fluid flow will pass through an orifice in the orifice plate 158 held by the carrier 156.

The orifice plate carrier 156 has a carrier extension 160 which extends radially from the pipeline. The carrier extension 160 is received in and travels in an orifice body upper chamber 162.

With reference to the enlarged view in FIG. 8 and continuing reference to FIG. 7, the upper chamber 162 includes a pair of opposed seal rings 164 and 166, each having a central opening therethrough. Each of the seal rings 164 and 166 has external threads which engage internal threads on seal ring retainers 168 and 170. The seal ring retainers 168 and 170 are fastened to the upper chamber 162, such as with fasteners 163.

The seal rings 164 and 166 each have slots or recesses 172 and 174 which engage with projections 176 and 178 on seal ring cranks 180 and 182. Each seal ring thus may be independently tightened or loosened. When in place, the seal ring cranks cover the central openings in the seal rings.

Each seal ring retainer 168 and 170 has an internally threaded cavity in which is received an access or entry plug 184 and 186, respectively, having external threads. Each entry plug contains a central opening so that the seal ring crank passes therethrough with projections which mate with recesses on the seal ring.

The orifice plate carrier 156 and its associated plate and seals are moveable between the lower chamber 152 and the upper chamber 162.

Once the carrier 156 is fully raised adjacent the cavity of the seal rings 164 and 166, each seal ring may be sealed against the plate carrier 156. Seal ring gaskets 188 and 190 extend from innerfaces of the seal rings and assist in maintaining the seal between the face of the plate carrier and the seal ring. Teflon seat guides 191 may also assist in maintaining a proper seal.

When closing either of the seal rings of the upper chamber against the orifice plate, the gas pressure is approximately equal on all sides of the seal ring since the gas through the orifice fitting can flow from the pipeline through the entire duplex valve. The gas pressure in the upper chamber will be approximately that in the lower chamber. Once either or both of the seal rings 164 and 166 are closed against the face of the carrier plate 156, the gas pressure in the upper chamber may be bled off by opening a bleed valve 192. The pressure in the upper chamber will thereby return to approximately atmospheric pressure.

Thereafter, it is possible to unscrew either or both of the entry plugs 184 and 186 from the seal ring retainers. After doing so, the accompanying crank may also be lifted out and removed. This will allow access to the orifice plate, and the accompanying seals with the seal rings still in place.

After maintenance or service has been performed, the crank or cranks will be replaced and the entry plug or plugs will be threaded back onto the retainer. Once this has been accomplished, a seal is re-created in the upper chamber to form a closed chamber. Thereafter, the bleed valve 192 will be closed and the equalization valve 194 will be opened in order to repressurize the upper chamber. By opening the equalization valve, gas from the lower chamber 152 will be allowed to flow into the upper chamber. The gas pressure in the upper chamber will increase to that in the lower chamber. Thereafter, the seal ring may be unthreaded slightly to loosen it from the face of the carrier plate. Once this has been accomplished, it is possible to lower the carrier plate into the lower chamber.

The same teachings may be employed in a gate valve for controlling fluid flow similar to that shown in FIGS. 6A and 6B.

Whereas, the present invention has been described in relation to the drawings attached hereto, it should be understood that other and further modifications, apart from those shown or suggested herein, may be made within the spirit and scope of this invention.

What is claimed is:

1. A process to access a plate carrier having an orifice plate and carrier plate seals in an orifice fitting, which process comprises:

moving said plate carrier from a pressurized orifice body lower chamber to an orifice body upper chamber;

sealing a seal ring in said upper chamber against said plate carrier to create a fluid tight seal between said upper body chamber and said plate carrier by mating projections on a crank with recesses in said seal ring and rotating said crank;

bleeding off pressure in said upper body chamber to atmospheric pressure;

unscrewing an entry plug threadably connected to a retainer and removing said crank in said upper chamber to allow access to said orifice plate and to said carrier plate seals;

replacing said crank and said entry plug;

repressurizing said upper body chamber; and loosening said seal ring from said plate carrier by rotating said crank before returning said plate carrier to said lower body chamber.

2. A process to access a plate carrier as set forth in claim 1 wherein said plate carrier is moved by rotating a stem screw attached to said plate carrier.

3. A process to access a plate carrier as set forth in claim 1 wherein said orifice fitting includes two opposed seal rings, and including the additional step of moving each said seal ring independently to tighten against said plate carrier.

4. A process to access a plate carrier as set forth in claim 1 wherein said pressure is bled off in said upper body chamber through a bleed valve.

5. A process to access a plate carrier as set forth in claim 1 wherein said upper chamber is repressurized through an equalization valve connecting said upper chamber with said lower chamber.

6. An orifice fitting for measurement of fluid flow therethrough, which fitting comprises:

a plate carrier having an orifice plate and carrier plate seals;

an orifice body lower chamber for receiving said plate carrier therein;

an orifice body upper chamber including at least one seal ring, each said seal ring movable to tighten against said plate carrier with a threaded connection to a retainer;

means to move said plate carrier between said upper and said lower chambers; and at least one removable entry plug in said upper chamber to allow access to said plate carrier, to said orifice plate and to said carrier plate seals without interrupting or disabling fluid flow through said lower chamber, each said entry plug having external threads mating with threads on said retainer.

7. An orifice fitting as set forth in claim 6 including a crank juxtaposed between said seal ring and said entry plug.

8. An orifice fitting as set forth in claim 6 wherein said upper chamber includes a pair of opposed said seal rings, each moveable independently.

9. An orifice fitting as set forth in claim 6 including means to equalize pressure in said upper chamber with pressure in said lower chamber.

10. A process to access a plate carrier having a plate and plate seals in a gate valve, which process comprises:

moving said plate carrier from a pressurized orifice body lower chamber to an orifice body upper chamber;

sealing a seal ring in said upper chamber against said plate carrier to create a fluid tight seal between said upper body chamber and said plate carrier by mating projections on a crank with recesses in said seal ring and rotating said crank;

bleeding off pressure in said upper body chamber to atmospheric pressure;

unscrewing an entry plug threadably connected to a retainer and removing said crank in said upper chamber to allow access to said plate and to said plate seals;

replacing said crank and said entry plug;

repressurizing said upper body chamber; and loosening said seal ring from said plate carrier by rotating said crank before returning said plate carrier to said lower body chamber.

11. A process to access a plate carrier as set forth in claim 10 wherein said plate carrier is moved by rotating a stem screw attached to said plate carrier.

12. A process to access a plate carrier as set forth in claim 10 wherein said gate valve includes two opposed seal rings, each said seal ring movable to independently tighten against said plate carrier.

* * * * *